Feb. 28, 1967      P. A. G. LEPELLETIER      3,306,678
LOAD BRAKE PROPORTIONING FOR AN AUTOMOBILE VEHICLE
Filed July 30, 1965                          8 Sheets-Sheet 6

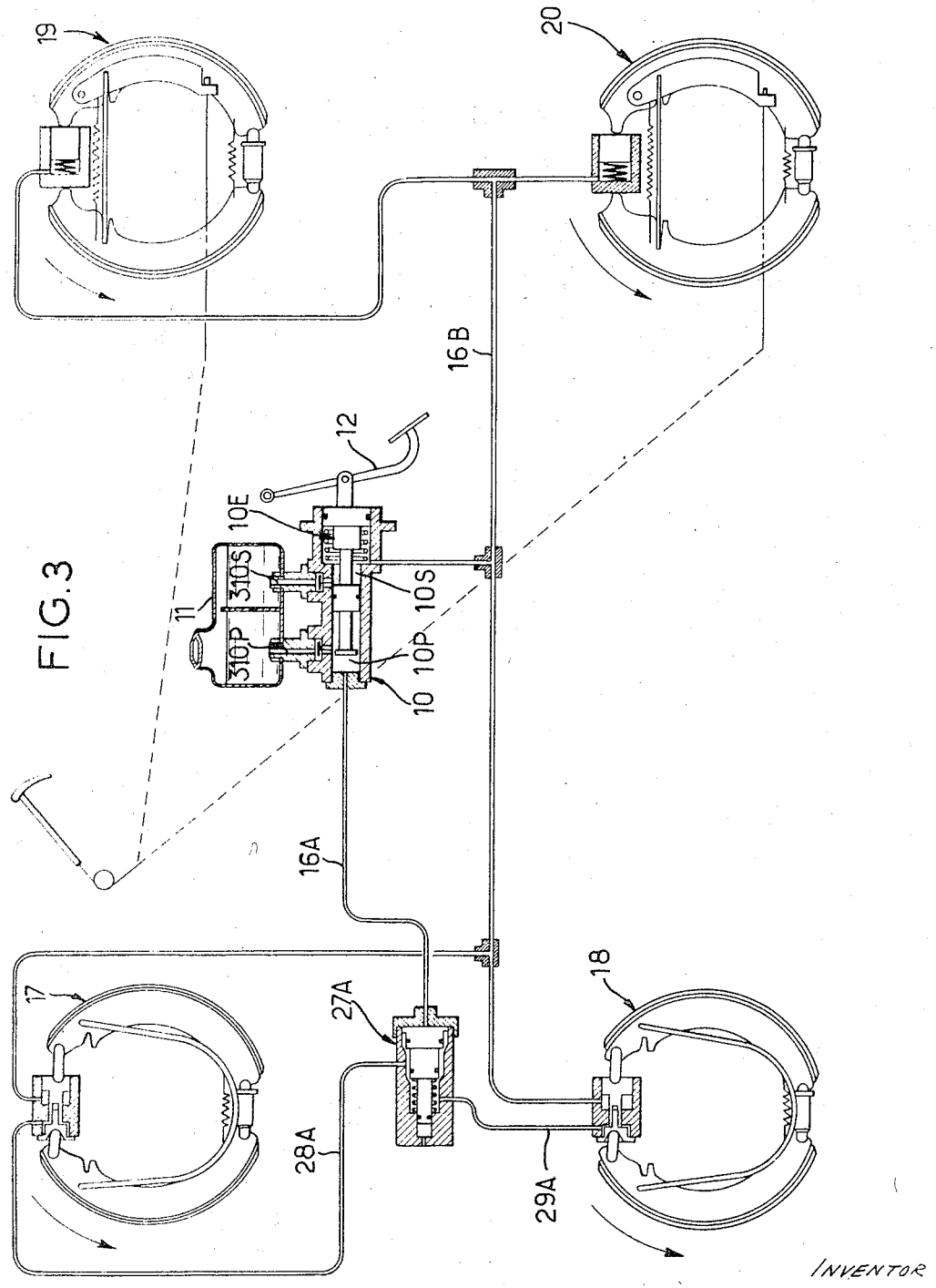

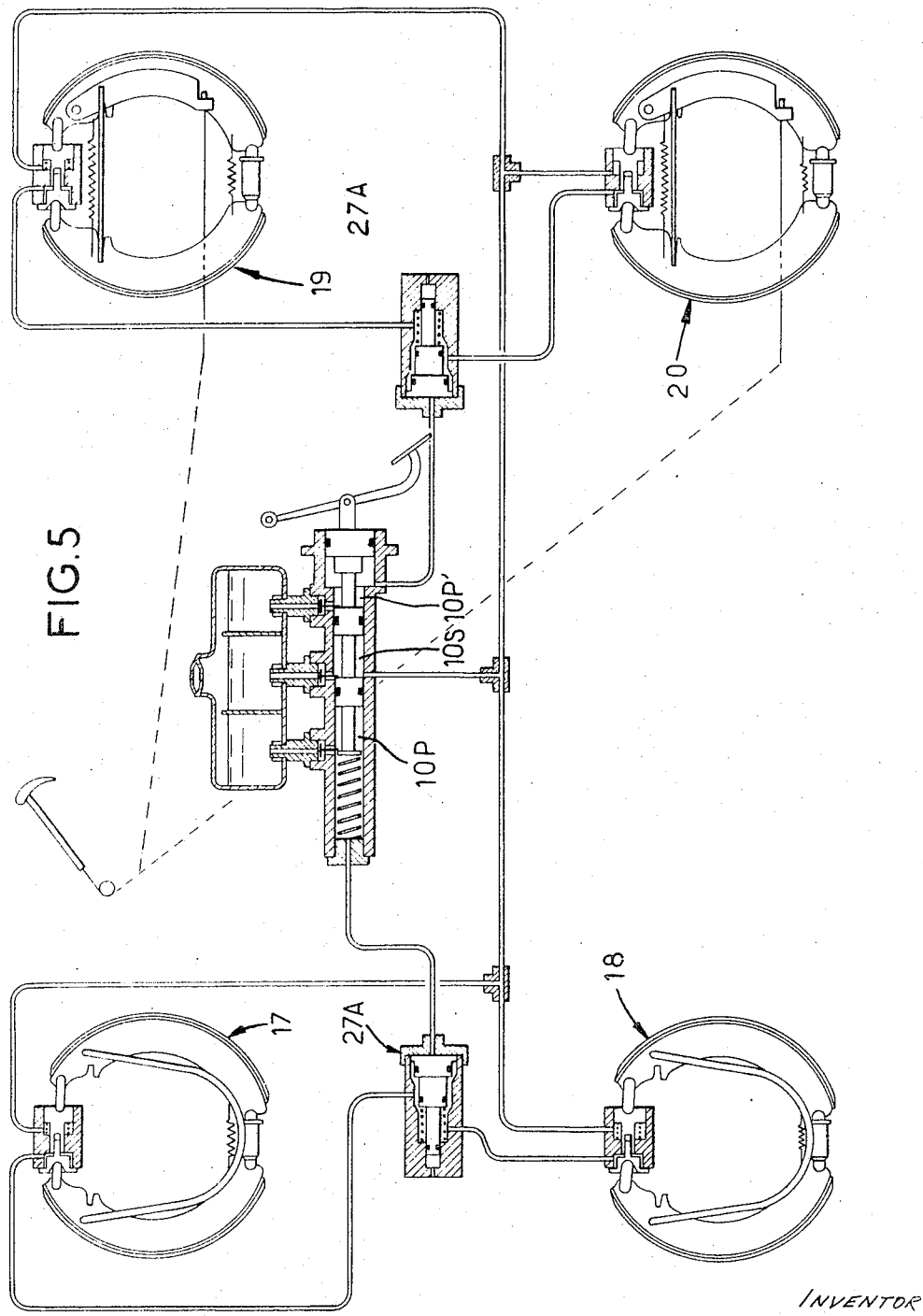

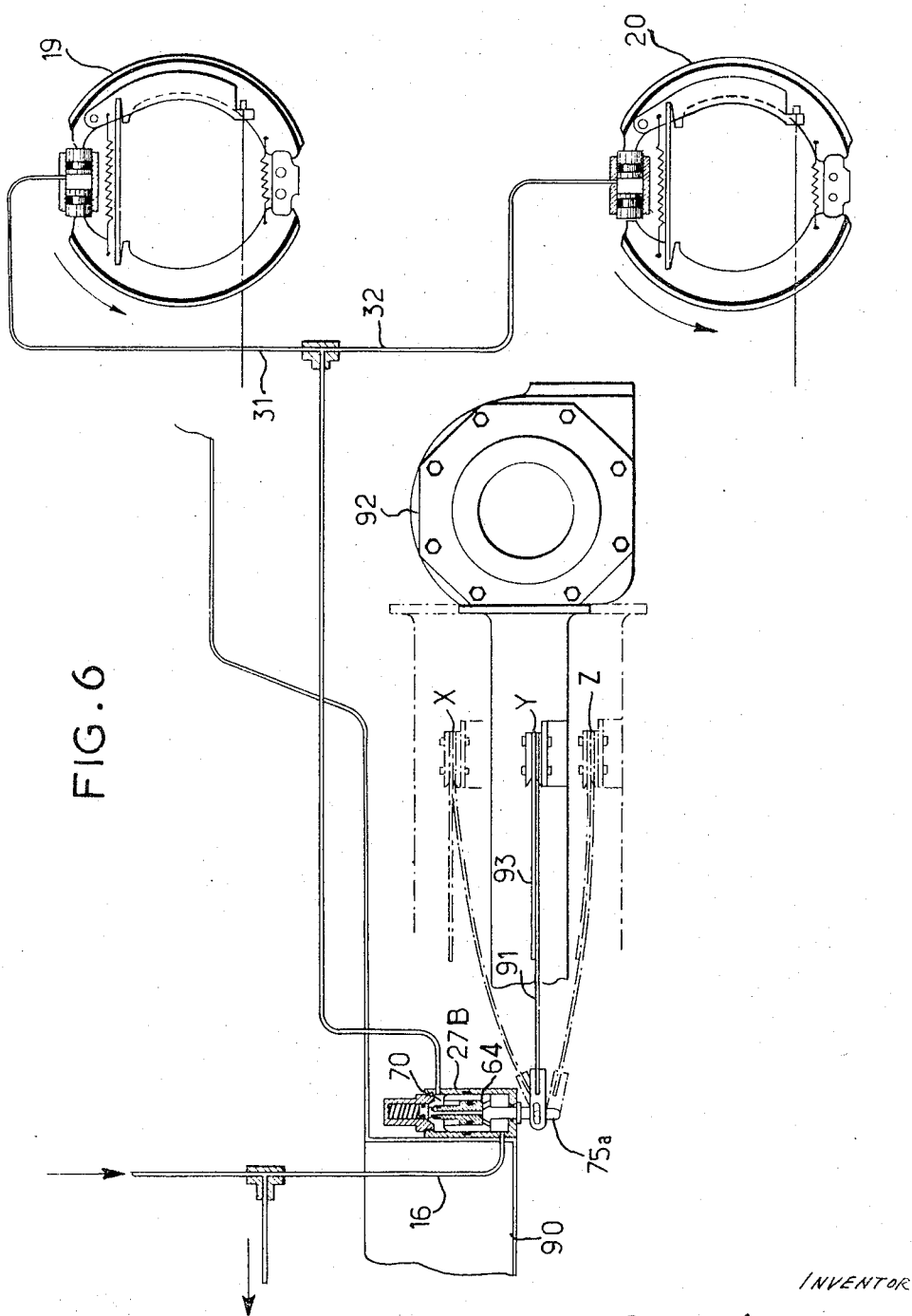

INVENTOR
PIERRE ANDRE
GEORGES LEPELLETIER
By Young & Thompson
ATTYS

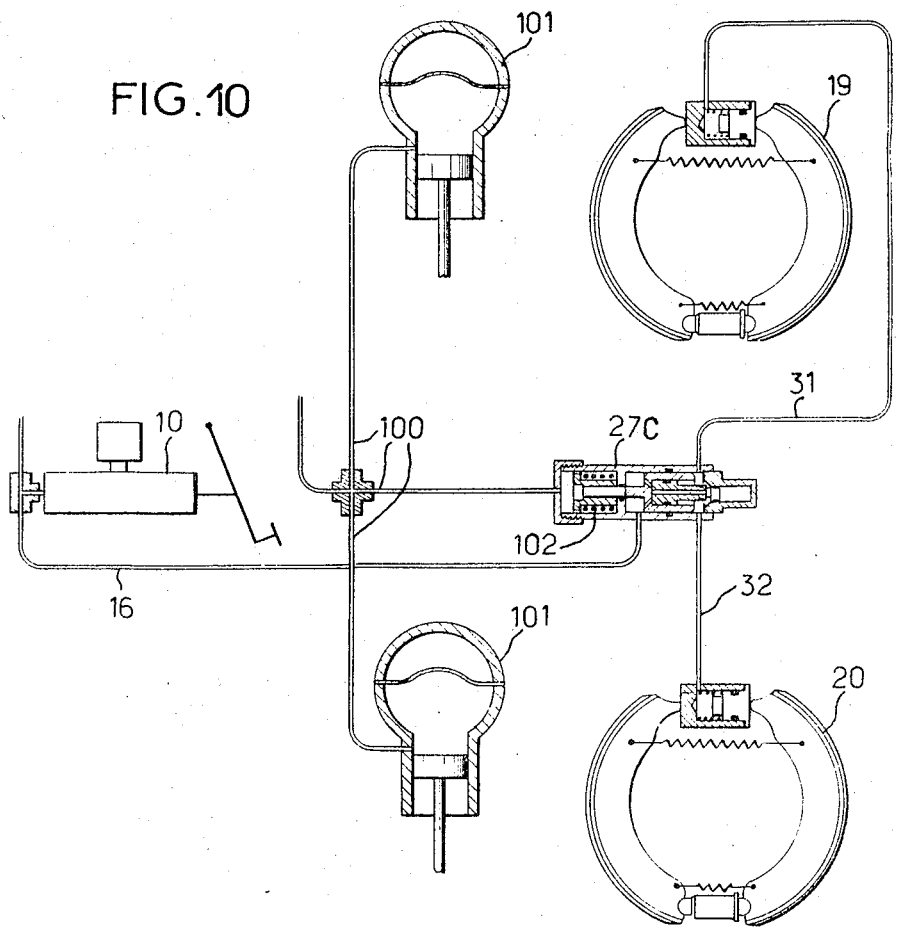

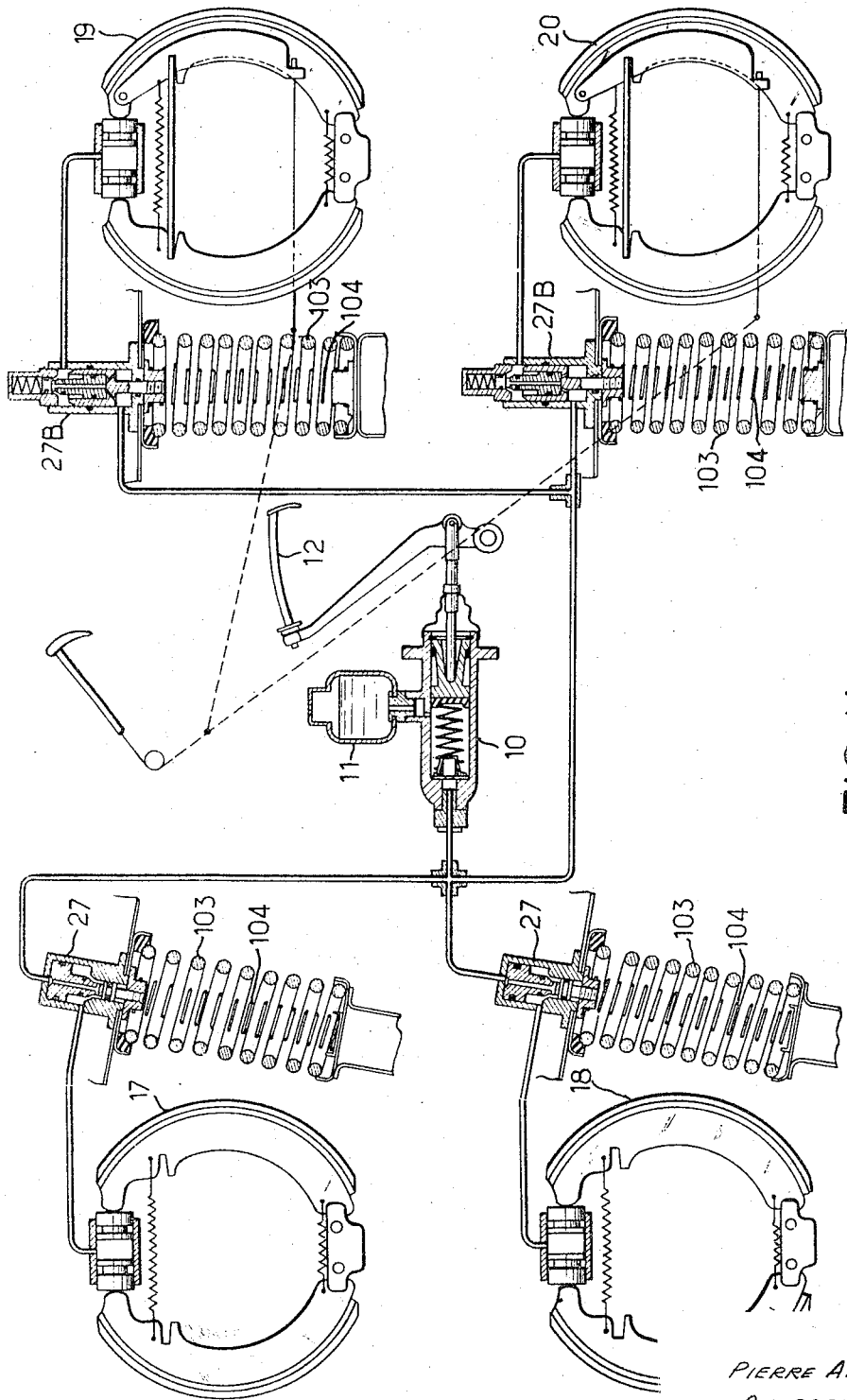

United States Patent Office 3,306,678
Patented Feb. 28, 1967

3,306,678
LOAD BRAKE PROPORTIONING FOR AN AUTOMOBILE VEHICLE
Pierre André Georges Lepelletier, Chatou, France, assignor to Societe anonyme Francaise du Ferodo, a corporation of France
Filed July 30, 1965, Ser. No. 476,025
Claims priority, application France, Aug. 8, 1964, 984,649
10 Claims. (Cl. 303—22)

The present invention relates to braking devices for automobile vehicles, comprising a master-cylinder driving a hydraulic fluid for applying the brakes of the front axle and the brakes of the rear axle of the vehicle, in which, in order to take more precise account of the transfer of weight and the conditions of distribution of load during braking, pressure, correcting means are associated with the said front brakes and/or with the said rear brakes.

The present invention has for its object a braking device of this type, in which, according to one of the characteristic features of the invention, the said correction means comprise: a hollow body pierced with at least one first bore and one second bore, the said second bore being coaxial with the first but of larger diameter, and the said first bore terminating opposite the said second bore in a conical coupling surface converging in a direction opposite to the said second bore; a piston arranged in the said body in the axis of the first bore of said body and provided with an annular transverse groove; and an annular sealing joint disposed in the said groove of the said piston; the said piston being axially movable in the said body, between a first position at which the said joint is not engaged in the said first bore of the body, so that the said bores communicate with each other, and a second position at which said joint is engaged in the said first bore with a fluid-tight contact, so that the said bores do not communicate with each other.

In accordance with a preferred form of construction, the conicity of the said coupling surface is comprised between 10° and 15°; the said piston has a frusto-conical leading surface having a conicity advantageously and preferably comprised between 15° and 30°; and the sealing joint is of the type having a cruciform section and provided, when it is in the first bore of the body, with a compression comprised between 3% and 8%, and preferably equal to 5%.

According to one form of application, the correction means are associated with the brakes of the front axle of the vehicle, and the piston disposed in the hollow body of the said correction means is provided with at least two bearing surfaces of different diameters forming between them in the said body at least one transfer chamber coupled to at least one of the front brakes, and at least one chamber connected to atmosphere, the said body being connected by its extremity close to the large bearing surface to an incoming pressure conduit, a passage in the said piston to provide a communication between the said pressure-intake conduit and the said transfer chamber, said passage being open or closed depending on the position of the piston, the said piston being urged to move by the action on the one hand of the pressure in the pressure-intake conduit, and on the other hand of atmospheric pressure, of the pressure in the transfer chamber and of control means exerting a force applied on the said piston.

In an alternative form, two transfers chambers are provided and are respectively coupled to the two brakes of the front axle, the said transfer chamber being preferably isolated in succession from the pressure-intake conduit during the movement of the piston.

In accordance with another form of application, the correlation means as associated with the brakes of the rear axle and comprise a first piston and a second piston arranged in the said hollow body, at least the first piston having at least two bearings surfaces of different diameters, the first and second pistons each being provided internally with at least one passage and defining: a transfer chamber located between the two bearing surfaces of the first piston and on one side of the second piston, the said chamber being coupled to the rear brakes; a pressure-intake chamber located on the other side of the second position; a chamber in communication with the atmosphere, located on that side of the bearing surface of the first piston which has the smaller diameter, the said passage forming a communication between the said intake chamber and the said transfer chamber, and being open or closed depending on the position of the first piston; the second piston being urged to move by the action on the one hand of the intake pressure and control means, on the other hand of the pressure in the transfer chamber; the first piston being subjected on the one hand to the intake pressure and on the other hand to a spring, to atmospheric pressure and to the pressure in the transfer chamber.

The first and second pistons may be telescopically mounted on inside the other.

The control means for the correction means can consist of springs, or again are preferably controlled in dependence on the conditions of distribution of load of the vehicle, so that their action is modified as a function of the load of the vehicle.

In accordance with another characteristic feature of the invention, the action of the control means can, depending on the conditions of distribution of load of the vehicle, be orientated in one direction or in the other on the second piston.

In another form of embodiment of the invention, the control means associated with the correction means comprise elastic means interposed between the suspended and non-suspended portions of the vehicle. The elastic means are preferably of variable flexibility and have for example a different strength depending on whether they act under traction or in compression by virtue of the addition of auxiliary elastic means acting according to a predetermined method.

In accordance with a further form of construction for the application of the invention to vehicles fitted with an oleopneumatic suspension, the control means associated with the correction means are controlled by the said oleopenumatic suspension of the vehicle.

According to a further form of construction, each of the brakes of the front axle of the vehicle is provided with a correction means controlled by the force applied on the corresponding front wheel, and each of the brakes of the rear axle of the vehicle is provided with a correction means controlled by the force applied on the corresponding rear wheel.

The objects, characteristic features and advantages of the invention will furthermore be brought out in the description which follows below of forms of construction chosen by way of example, reference being made to the accompanying drawings, in which:

FIGS. 3 and 4 are respectively similar to FIGS. 1 and 2, and illustrate the application of the invention to an axle, the brakes of which are of the so-called "self-stable" type;

FIG. 5 is a view similar to FIG. 1 and refers to another application of the invention, in which the two axles are provided with brakes of the "self-stable" type;

FIG. 6 shows diagrammatically a braking device according to the invention, in which a corrections means associated with the brakes of the rear axle is regulated in dependence on the conditions of distribution of load on the vehicle;

Figure 7:
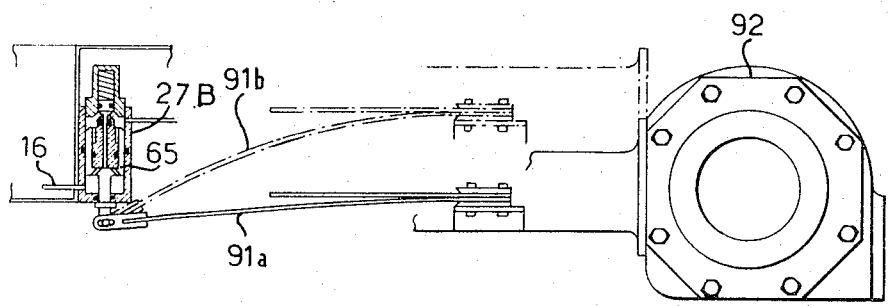
FIGS. 7 and 8 are views similar to FIG. 6, and illustrate the operation of the device shown.
Figure 8:
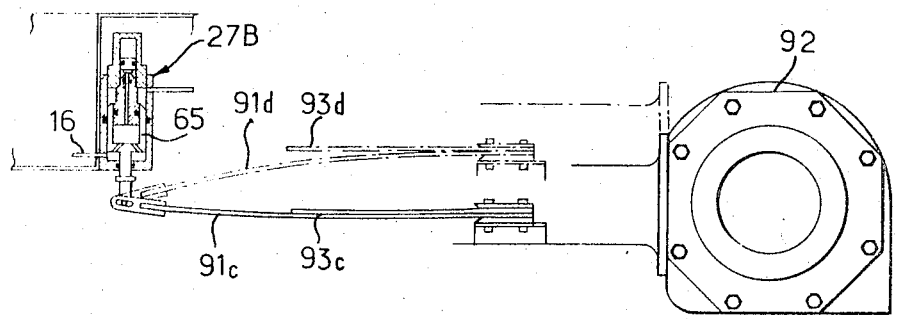
Figure 9:
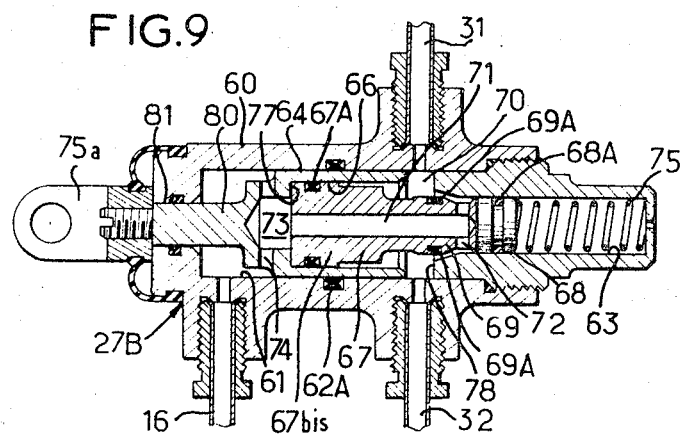

FIG. 9 relates to the correction means employed in the arrangements of FIGS. 6 to 8;

FIG. 10 shows an application of correction means according to the invention, to a vehicle provided with an oleo-pneumatic suspension;

FIG. 11 is a diagrammatic view of an alternative form of the braking device, in which each of the front and rear wheels of the vehicle are provided with correction means.

Figure 1:
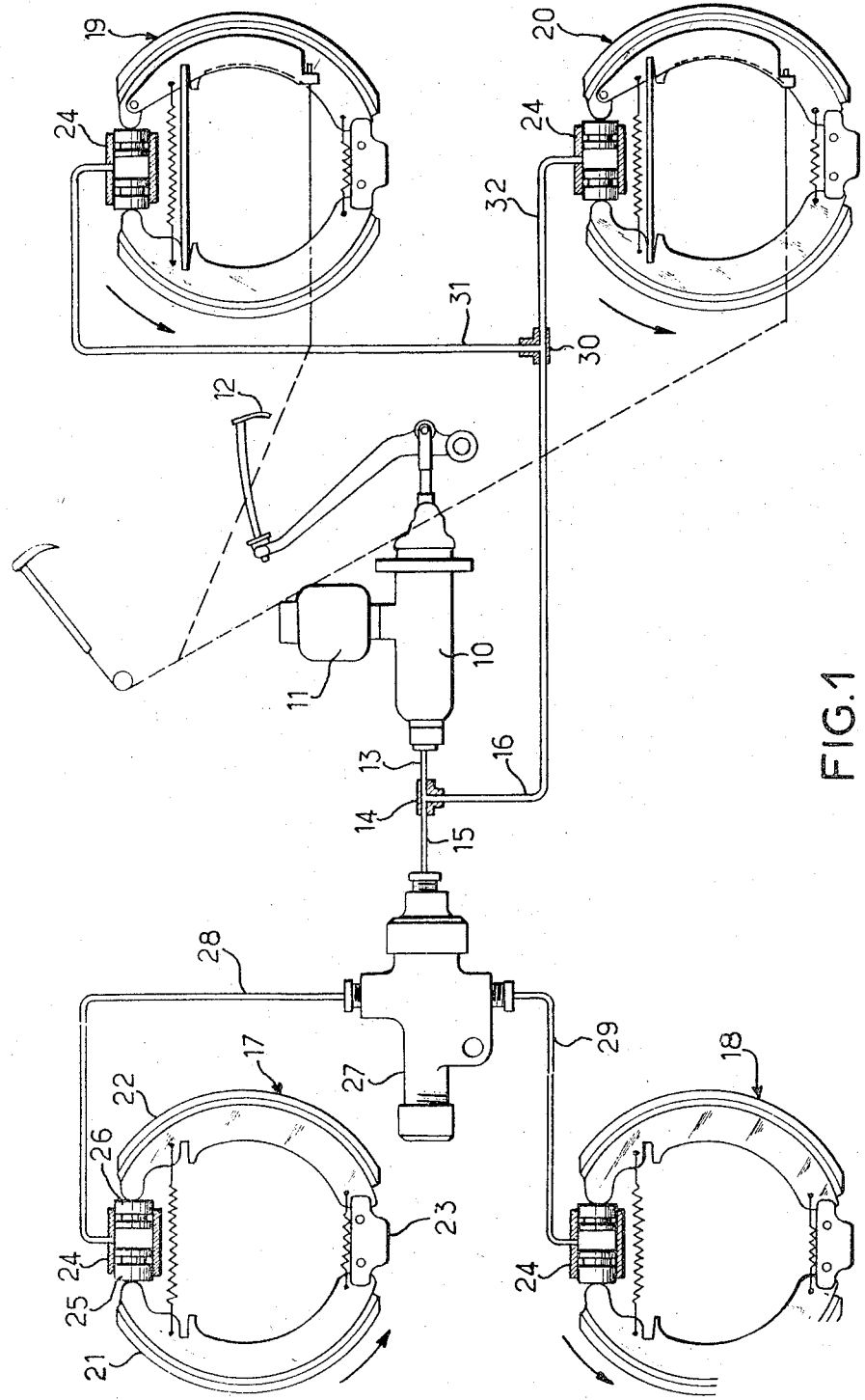
FIG. 1 is a diagrammatic view of a device according to the invention, in which correcting means are associated with the brakes of the front axle of the vehicle.

In the example shown in FIG. 1, a braking device in accordance with the invention comprises a master cylinder 10 provided with a tank 11 and a brake-pedal 12. The latter is adapted to drive oil into a conduit 13, which is connected at 14 on the one hand to a conduit 15 for the supply of the front brakes 17 and 18, and on the other hand to a conduit 16 for the supply of the rear brakes 19 and 20. Each of the brakes 17, 18, 19 and 20 is of the usual type with jaws, comprising a compressed jaw 21 and a tension jaw 22, which are supported against a fixed abutment 23 and which are actuated by a hydraulic cylinder 24 with pistons 25 and 26.

The conduit 15 for supplying the front brakes 17 and 18 is connected to a correction device 27, from which leave a conduit 28 for supplying the cylinder 24 of the right-hand front brake 17 and a conduit 29 for supplying the cylinder 24 of the left-hand front brake 18. The conduit 16 for supplying the rear brakes 19 and 20 is directly connected at 30 to two conduits 31 and 32 which respectively supply the cylinders 24 of the rear brakes 19 and 20.

Figure 2:
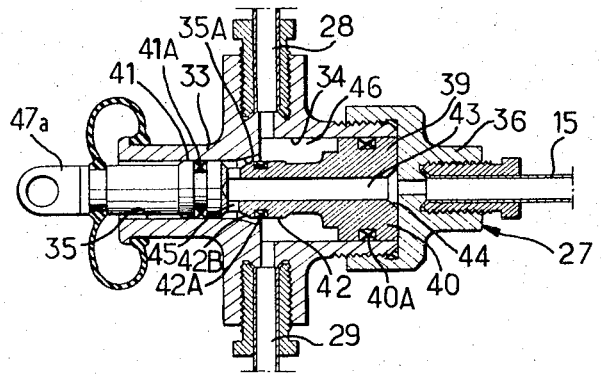
FIG. 2 is a view in longitudinal section of the correcting means.

The corrector device 27 is shown in detail in FIG. 2, to which reference will now be more particularly made. The corrector device 27 comprises a body 33 having a first bore 34 and a second bore 35. The latter is aligned with the bore 34 and is of smaller diameter; it opens into the bore 34 by a conical surface 35A, the conicity of which is comprised between 5° and 20° and preferably between 10° and 15°. On the extremity of the bore 34 is screwed a plug 36, to which is coupled the conduit 15. At the extremity of the bore 35, a rod 47a coupled to the piston 39, passes out of the corrector device 27, so as to be acted upon by any appropriate external force, variable or not during operation, for example varying as a function of the load on the vehicle; the rod 47a thus plays the part of a control means, as will be clearly understood later.

A piston 39 comprises a first bearing surface 40 provided with a joint 40A, permanently engaged in the bore 34, a second bearing surface 41 provided with a joint 41A, permanently engaged in the bore 35, and a third bearing surface 42 which is included between the bearing surfaces 40 and 41 and is provided with an annular joint 42A, of the type having a cruciform section. The bearing surface 42 terminates facing the bore 35 in a conical surface 42B, the conicity of which is comprised between 15° and 30°.

The bearing surface 42 has the same diameter as the surface 41, and depending on the position of the piston 39, extends into the first bore 34 (the case of FIG. 2) or passes into the second bore 35, its joint 42A then co-operating with the said bore 35; in this case, the latter joint has a compression comprised between 3% and 8% and advantageously equal to 5%. A passage 43 formed in the piston 39 extends between the extremity 44 of the bearing surface 40 and one or more openings 45 comprised between the bearing surfaces 41 and 42.

A transfer chamber 46 is formed in the bore 34 and is defined between the bearing surface 40 on the one hand and either the surface 41 or the surface 42 on the other, depending on whether the bearing surface 42 is not or is engaged in the bore 35. The conduits 28 and 29 communicate with the transfer chamber 46 in the vicinity of the bore 35.

During the course of breaking, as long as the pressure in the conduit 15 remains insufficient to overcome the controlling force to which the rod 47a is subjected, the piston 39 remains in the position shown in FIG. 3, in which the passage 43 causes the conduit 15 to communicate with the chamber 46, that is to say with the conduits 28 and 29 connected to the front brakes 17 and 18.

Under these conditions, the pressure is the same in the conduit 15, in the transfer chamber 46 and in the conduits 28 and 29.

Above a predetermined threshold value of pressure in the conduit 15, the piston 40 is moved towards the left of FIG. 2, which engages the bearing surface 42 in the bore 35 and closes the communication between the conduit 15 and the chamber 46 by the action of the joint 42A, which is advantageously guided by the conical surface 35A of the body 33. If S represents the section of the bore 34, $s$ the section of the bore 35, R being the controlling force to which the rod 47a is subjected, and $p$ is the pressure in the conduit 15 and P the pressure in the conduits 28 and 29, we then have the following relation:

$$P(S-s)-pS+R=0$$

The pressure P in the conduits 28 and 29 is thus from then on greater than the pressure $p$ in the conduit 15. The corrector device 27 serves as a pressure booster for the front brakes 17 and 18.

The device according to the invention thus permits, after a first phase, of reinforcing the braking effect at the front in a second phase with respect to the braking at the rear, which enables a more precise account to be taken of the variations of load and of transfers of weight which take place during braking.

According to the invention and as will be indicated later in more detail, the controlling force to which the rod 47a is subjected may be provided in such manner as to be automatically adjustable during working, especially in dependence on factors such as the conditions of distribution of load of the vehicle.

The master cylinder 10 and the brakes 17, 18, 19 and 20 shown in FIG. 1 are of a usual type but according to the invention, they may be provided as any other suitable type. For example, the master cylinder and the rear brakes may be of the so-called "self-stable" type described in the U.S. patent application No. 462,007 of June 7, 1965 in the name of the Societe Anonyme Francaise du Ferodo (Mr. Pierre André Georges Lepelletier), and in which the front brakes are supplied by a pressure which results from the braking reaction in the rear brakes, a pressure booster such as the corrector device 27 being then interposed in the supply circuit of the front brakes.

Reference will now be made to FIG. 3, which shows the application of the invention to so-called "self-stable" brakes, and illustrates one of the numerous advantages of the invention. In this example, the front brakes 17 and 18 are of the "self-stable" type and the rear brakes are of the conventional "self-releasing" type.

In the master cylinder 10, a moving system 10E, subjected to the action of the pedal 12, defines a primary chamber 10P and a secondary chamber 10S which communicate with the tank 11 through the conduits 310P and 310S respectively, the latter being closable by clapper-valves, as is well known per se, when the pedal 12 pushes the system 10E sufficiently far into the body of the master cylinder 12.

A conduit system 16A connects the primary chamber 10P of the master cylinder 11 to a corrector device 27A, detailed below, from which start the conduits 28A and 29A connected to the primary chambers of the operating cylinders of the front brakes 17 and 18; and a conduit system 16B connects the secondary chamber 10S of the master cylinder 10 to the operating cylinders of the rear brakes 19 and 20 and also to the secondary chambers of the operating cylinders of the front brakes 17 and 18.

Figure 4:
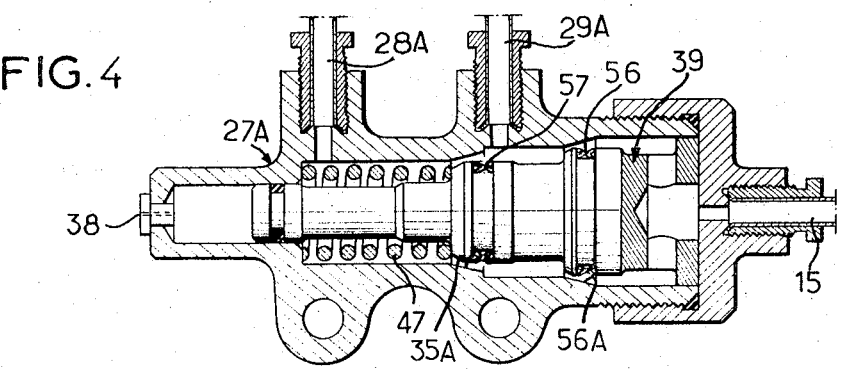

The corrector device 27A, FIG. 4, is similar to that which has already been described with reference to FIG. 2, but the controlling means supplying the control force are constituted by a calibrated spring 47 arranged between the bearing surface 42 of the piston 39 and a shoulder formed in the body 33; forward of the bore 35, the body 33 is pierced with an air-vent 38 which causes it to communicate with the atmosphere. In addition, the two conduits 28A and 29A are respectively associated with two separate transfer chambers coupled together by the conical surface 35A, in cooperation with joints 56 and 57.

The operation of the corrector device of FIG. 4 is similar to that of FIG. 2. As long as the pressure is relatively low in the conduit 15, the piston 39 remains in the position shown in FIG. 4, which produces the same pressure in the conduit 15 and in the conduits 28A and 29A. Above a predetermined threshold of pressure corresponding to the calibration of the spring, the piston 39 is pushed back towards the left of FIG. 4, which closes the communication between the conduit 15 and the conduits 28A and 29A. From that moment, the pressure in the conduits 28A and 29A is made higher than the pressure in the conduit 15.

In addition, two closures are effected instead of one only, in cooperation with the joints 56 and 57, and these closures are preferably not brought into operation quite at the same time. For example, it is arranged so that the closure by the joint 56 takes place first so as to isolate the conduit 15 in the first place, as in FIG. 2, and then at a second stage, the closure is effected by the joint 57 in order to isolate the two transfer chambers and therefore the two conduits 28A and 29A from each other.

The corrector device of FIG. 4 thus constitutes a pressure divider and booster, the applications of which can be numerous and varied. Matters are so arranged that the first phase, before the isolation of the circuit 15 is sufficient to permit the filling and the drainage of the circuits 28 and 29, under low pressure, without premature closure, the differential sections between each bearing surface of the piston 39 and the corresponding bores being equal or proportional so as to drive equal or proportional volumes of oil into the conduits 28A and 29A.

One of the important advantages of the arrangement shown in FIG. 3, resides in that it enables a master cylinder to be employed which, in the case where one of the axles is self-stable, comprises only two chambers, namely a primary chamber and a secondary chamber, instead of three chambers, namely two primary chambers and one secondary chamber, as would be required by the usual arrangements of this type. In other words, the axial dimension of the master cylinder is advantageously reduced, while the corrector device 27A can be arranged at any other place which may be desired.

According to the alternative form shown in FIG. 5, both the axles are self-stable. To this end, the master cylinder comprises a second primary chamber 10P' coupled to the primary chambers of the operating cylinders of the rear brakes 19 and 20 through the intermediary of a corrector device 27A of the same type as that previously described. A usual arrangement would have necessitated the use of a master cylinder with five chambers.

FIG. 6 shows diagrammatically the mounting on the chassis of an automobile vehicle of a corrector device 27B according to the invention, shown to a larger scale in FIG. 9.

This corrector device 27B which is an alternative form of the correctors previously described, comprises a body 60 in two parts screwed one on the other and having a large bore 61 communicating with the conduit 16, and a small bore 63 connected to the atmosphere.

A first piston 67 comprises a first bearing surface 68 provided with a joint 68A engaged permanently in the bore 63, a second bearing surface 67 bis provided with a joint 67A and a third bearing surface 69 provided with a joint 69A which is comprised between the two bearing surfaces 68 and 67 bis, and which is provided facing the bore 63 with a conical coupling surface similar to those previously described. The bearing surface 69 has the same diameter as the surface 68 and, depending on the position of the piston 67, does not pass into (the case of FIG. 9) or passes into the small bore 63, its joint 69A then cooperating with the said bore.

A second hollow piston 64 receives the first piston in the bore 66 at the level of its bearing surface at 67 bis, the two pistons being thus both telescopically engaged in the large bore 61 which comprises a joint 62A. This second piston 64 is extended by a tail 80 and then beyond a bore 81 by a control rod 75a which projects from the bore 61.

A transfer chamber 70 is formed in the bore 62 between the piston 64, the bearing surface 67 bis and the surface 68 or 69. The conduits 31 and 32 which supply the rear brakes communicate with the chamber 70.

A passage 71 formed in the piston 67 and the third bearing surface 69 connects an opening 72 formed between the bearing surfaces 68 and 69 and a recess 73 which is formed in the piston 64 and which communicates with the chamber 61 through openings 74. A spring 75 is applied against the surface 68 and tends to push back the first piston 67 into abutment against a shoulder 77 of the second piston 64.

The operation of the corrector device 27B is as follows: as long as the pressure remains low in the conduit 16, the device 27B occupies the position shown in FIG. 9. A communication is formed between the conduit 16 and the conduits 31 and 32 by the passage 61, 74, 73, 71, 72 and 70. Above a first predetermined threshold value of the pressure in the conduit 16, the first piston 67 overcomes the bias of the spring 75 and its bearing surface 69 is engaged in the bore 63. The joint 69A is such that its compression is then about 5%. The chamber 70 is henceforth isolated from the conduit 16. From that moment, the pressure in the conduits 31 and 32 becomes greater than the pressure in the conduit 16 in a manner similar to that which has previously been described.

When the pressure in the conduit 16 and therefore in the chamber 70 becomes sufficient, the second piston 64 overcomes the controlling force applied, as described below, by the rod 75a. The second piston 64 moves back towards the left, and as the volume of oil in the downstream circuit 31–32–70 is isolated from then on by means of the joint 69A, the backward movement of the second piston 64 causes a forward movement of the first piston 67 towards the right and this movement continues until the piston 67 comes into abutment at 78 against the body of the device. At this moment, the second piston 64 reaches a position towards the left at which it still retains sufficient working travel, both towards the right and towards the left. This condition can be satisfied by a suitable choice of the respective travels of the two pistons. Beyond this transition point, the pressure in the conduits 31 and 32 is equal to the sum of a quantity proportional to the pressure in the conduit 16 and the controlling force applied on the rod 75a.

The device 27B of FIG. 9 thus possesses three phases of operation: a first phase in which the pressure in the conduits 31 and 32 is equal to the pressure in the conduit 16; a second phase in which the pressure in the conduits 31 and 32 is higher than the pressure in the conduit 16; and a third phase in which the pressure in the conduits 31 and 32 is equal to the sum of a quantity proportional to the pressure in the conduit 16 and the controlling force applied on the rod 75a.

The first phase is made short. It is intended to permit the filling and the drainage of the downstream circuit 31, 32 without premature closure, and also to take-up various plays. For that purpose, the spring 75 is calibrated to a value at least equal to the pressures which balance the restoring springs of the brakes. In this way, the respective operating positions of the first piston 67 and the second piston 64 remain always the same during the second and third phases, irrespective of the conditions of wear of the brakes.

The apparatus shown in FIG. 9 thus constitutes a corrector device which makes it possible to give the rear brakes an attenuated braking torque when the braking is hard (third phase) and when the weight of the vehicle is increasingly transferred towards the front.

FIGS. 6 to 8 illustrate the application of the corrector device 27B of FIG. 9 to an automobile vehicle, the chassis of which has been shown diagrammatically at 90. An elastic device such as a spring blade acts on the rod 75a as a function of the vertical movements of the chassis 90 with respect to the axle 92 or any other part forming a part of the nonsuspended weight of the vehicle. The device 27B receives the upstream control pressure at 16, while the rear brakes 19 and 20 are supplied by the conduits 31 and 32 receiving the pressure from the transfer chamber 70. In FIG. 6, there can be seen different positions which the axle 92 can occupy with respect to the chassis 90, namely the positions X, Y, Z.

In all the positions included between X and Y, the flexible blade 91 has the effect of pushing against the piston 64. In the position Y, this action is annulled and in all the positions comprised between Y and Z, the flexible blade 91 pulls on the piston 64. The cases of thrust and traction can be differentiated by adding an auxiliary thrust blade 93 which, for example, adds its pressure action to the blade 91 in traction but does not act in thrust. The arrangement is such that the forces transmitted from the axle 92 to the chassis 90 through the intermediary of the flexible blades 91 and 93 remain small with respect to the load normally carried by the suspension springs of the vehicle.

In FIG. 7 there can be seen the action applied in the absence of braking by the flexible blade 91 on the one hand without load at 91a and on the other hand under load at 91b. These actions are always thrust. The thrust on no-load is less than the thrust on load but is nevertheless sufficient to maintain the piston 64 in its normal position of rest. The piston 64 is therefore always pre-stressed. The value of this pre-stress is more or less high, depending on the load carried by the rear axle 92.

In FIG. 8 similarly, there are shown the forces applied during the same braking by the flexible blades 91 and 93, on the one hand on no-load at 91c and 93c and under load at 91d and 93d. These are either thrusts or tensions. The tractive forces are increased by the effect of the supplementary blade 93 when this is provided.

To the three phases of operation already mentioned there is added a fourth phase, corresponding to the coming into action of the supplementary blade 93.

Because of this fourth phase, the blades 91 and 93 can apply a very strong tractive pull on the piston 64 during braking with very high deceleration on no-load, and can thus prevent the locking of the rear brakes in a still more effective manner. The importance of the fourth phase becomes less as and when the vehicle is more heavily loaded, and it is even possible to prevent its occurrence when the vehicle is fully loaded. However this may be, as soon as the third phase is entered on, by virtue of the piston 64 and the flexible blades 91 and 93, the load on the axle 92 acts directly on the rear braking, but this action remains modulated, however, by the upstream pressure in the conduit 16.

The construction utilizing the flexible blades 91 and 93 is of course only given by way of example. Any other methods of acting on the rod 75a in dependence on the load on the rear axle 92 may also be adopted, in particular by the introduction of thrusts or tractive forces on the device as a function of the load of the vehicle, or in other words, corrections both positive and negative in dependence on the load and with any appropriate constant or variable flexibility.

Reference will now be made to FIG. 10 which relates to an application of an alternative form 27C of the corrector device 27B to an automobile vehicle provided with an oleopneumatic suspension. In this case, the action of the flexible blades 91 and 93 can be replaced directly by the combined action of a spring 102 and an oil pressure derived from the conduits 100 of oleopneumatic suspension devices 101, it being understood that the arrangement would be similar for an air suspension, for example.

In the braking device shown in FIG. 11, pressure-booster corrector devices 27 of the same type as that shown in FIG. 2 and corrector devices 27B of the type shown in FIG. 9 are applied simultaneously but are mounted separately on each of the wheels of the vehicles. In this way, the oscillations of the vehicle on its shock-absorbers, in the manner of a pendulum, are made use of for the purpose of modulating the braking, not only as a function of variations of load and transfers of weight from the rear towards the front during the course of braking in a straight line, but also from right to left or vice-versa, under the effect of centrifugal force during braking on turns.

In FIG. 11, there can be seen at 103 the suspension springs of the four wheels of the vehicle; the flexible blades 91 of FIGS. 6 to 8 are in this case replaced by springs 104 which are coaxial with the suspension springs 103 and which can act on the devices 27 and 27B both in thrust and in traction following the distribution of the forces applied directly over each wheel.

It will of course be understood that the invention is not limited to the forms of construction described and shown, but includes all its alternative forms.

What I claim is:

1. A braking device for an automobile vehicle comprising a front axle and a rear axle each provided with brakes, said device comprising a master cylinder for driving a hydraulic fluid to actuate said brakes, and pressure-correcting means associated with said rear brakes so as to take into account more precisely the conditions of distribution of load and of transfers of weight during braking, said correction means comprising: a hollow body pierced with at least one first bore and a second bore, said second bore being coaxial with the first but of larger diameter, and said first bore terminating opposite said second bore in a conical coupling surface convergent in a direction opposite to said second bore; a piston disposed in said body in the axis of the first bore of said body and provided with an annular transverse groove; an annular sealing joint disposed in said groove of said piston; means for axially moving said piston in said body between a first position in which said joint is not engaged in said first bore of the body, so that said bores communicate with each other, and a second position in which said joint is engaged in said first bore with a fluid-tight contact, so that said bores do not communicate with each other; a second piston arranged in said hollow body, said first and second pistons being each provided internally with at least one passage; a spring, and a control means, at least said first piston comprising at least two bearing surfaces of different diameters, the first and second pistons defining with said hollow body, a transfer chamber location between the two bearing surfaces of the first piston and one side of the second piston, said chamber being connected to the rear brakes; a pressure-input chamber located on the other side of said second piston; and a chamber in communication with the atmosphere located on the side of the bearing surface of the first piston which has the smaller diameter, said passage in the first and second pistons causing said intake chamber to communicate with said transfer chamber and being open or closed, depending on the position of the first piston; said second piston being adapted to move under the actions of the intake pressure and said control means, the pressure in said transfer chamber; the first piston being subjected to the intake pressure and to said spring, to atmospheric pressure and to the pressure in said transfer chamber.

2. A braking device as claimed in claim 1, in which said first and second pistons are mounted telescopically one inside the other.

3. A braking device as claimed in claim 1, in which said control means are actuated in dependence on the conditions of distribution of load of said vehicle so that their action on said second piston is modified as a function of the load of said vehicle.

4. A braking device as claimed in claim 1, in which said control means comprise a spring.

5. A braking device as claimed in claim 3, in which said control means have an action during braking which is directed in one direction or the other on said piston in dependence on the transfers of load of said vehicle.

6. A braking device as claimed in claim 1, in which said control means associated with said correction means include elastic means interposed between the suspended and non-suspended parts of said vehicle.

7. A braking device as claimed in claim 6, in which said elastic means are provided with a variable flexibility.

8. A braking device as claimed in claim 7, in which said elastic means are of different strength depending on whether they act in traction or in thrust, by virtue of auxiliary elastic means acting in a single direction.

9. A braking device as claimed in claim 1, in which said vehicle comprises an oleo-pneumatic suspension, said control means associated with said correction means being actuated by said oleo-pneumatic suspension of said vehicle.

10. A braking device for an automobile vehicle comprising a front axle and a rear axle each provided with brakes, said device comprising a master cylinder for driving a hydraulic fluid to actuate said brakes, and pressure-correcting means associated with the brakes of at least one of said axles so as to take into account more precisely the conditions of distribution of load and of transfers of weight braking, said correction means comprising a hollow body pierced with at least one first bore and a second bore, said second bore being coaxial with the first but of larger diameter, two pistons slidably engaged in each other and in said hollow body, one at least of said pistons being slidably engaged in said hollow body being provided internally with a passage and being provided externally with at least two bearing surfaces of different diameters, a spring, a control means, the two pistons defining with said hollow body a first chamber, a second chamber and a third chamber, the first chamber being located between the said bearing surfaces of said one piston and on one side of the other piston, the second chamber being located on the side of that of said bearing surfaces having a smaller diameter and being in communication with the atmosphere, said passage causing the first chamber to communicate with the third chamber and being open or closed, depending on the position of either of said pistons, the said pistons being adapted to move not only under the action of the pressures in said three chambers but also under the action of said spring and said control means, the said spring cooperating with one of said pistons and the control means acting on the other piston, said control means being actuated in dependence on the conditions of distribution of load of said vehicle so that their action on said other piston is modified as a function of the load of said vehicle and is directed in one direction or the other.

References Cited by the Examiner
UNITED STATES PATENTS
3,173,264    3/1965    Hazeltine _____ 60—54.5

EUGENE G. BOTZ, *Primary Examiner.*